(12) United States Patent
Yonetsu (10) Patent No.: US 10,737,452 B2
(45) Date of Patent: Aug. 11, 2020

(54) TIRE VULCANIZATION MOLD AND TIRE MANUFACTURING METHOD USING THE SAME

(71) Applicant: Toyo Tire Corporation, Itami-shi, Hyogo (JP)

(72) Inventor: Isao Yonetsu, Itami (JP)

(73) Assignee: TOYO TIRE CORPORATION, Itami-shi (JP)

( * ) Notice: Subject to any disclaimer, the term of this patent is extended or adjusted under 35 U.S.C. 154(b) by 0 days.

(21) Appl. No.: 16/410,160

(22) Filed: May 13, 2019

(65) Prior Publication Data
US 2019/0366665 A1 Dec. 5, 2019

(30) Foreign Application Priority Data

May 31, 2018 (JP) .................. 2018-105248

(51) Int. Cl.
| | | |
|---|---|---|
| B29D 30/06 | (2006.01) | |
| B29D 30/72 | (2006.01) | |
| B29C 33/42 | (2006.01) | |
| B29C 33/30 | (2006.01) | |

(52) U.S. Cl.
CPC ......... B29D 30/72 (2013.01); B29D 30/0606 (2013.01); B29C 33/306 (2013.01); B29C 33/424 (2013.01); B29D 30/0662 (2013.01); B29D 2030/0612 (2013.01); B29D 2030/0616 (2013.01); B29D 2030/726 (2013.01)

(58) Field of Classification Search
CPC ............ B29D 30/0606; B29D 30/0662; B29D 2030/0612; B29D 2030/726; B29C 33/306; B29C 33/424
See application file for complete search history.

(56) References Cited

U.S. PATENT DOCUMENTS

| | | | | |
|---|---|---|---|---|
| 1,567,402 A | * | 12/1925 | Venn | ...................... B29C 33/424 425/35 |
| 1,969,083 A | * | 8/1934 | Lawson | .................. B29D 23/24 425/45 |
| 2,296,016 A | * | 9/1942 | Bostwick | ........... B29D 30/0606 425/28.1 |
| 4,547,139 A | * | 10/1985 | Hershberger | ...... B29D 30/0606 425/192 R |
| 4,625,101 A | * | 11/1986 | Hinks | .............. G06K 19/06028 152/523 |

(Continued)

FOREIGN PATENT DOCUMENTS

| | | | |
|---|---|---|---|
| JP | 58-66930 | * | 5/1983 |
| JP | 2005-88517 | * | 4/2005 |

(Continued)

*Primary Examiner* — James P Mackey
(74) *Attorney, Agent, or Firm* — Westerman, Hattori, Daniels & Adrian, LLP (57) ABSTRACT

A tire vulcanization mold includes a side molding surface, a mark forming stencil plate for forming a convex mark at an outer surface of a side portion, an attachment recess provided in the side molding surface, and a screw fixing the stencil plate to the attachment recess. The stencil plate is formed larger than the attachment recess so as to cover the attachment recess, and a peripheral portion of the stencil plate is in contact with an opening peripheral portion of the attachment recess.

17 Claims, 9 Drawing Sheets

(56) References Cited

U.S. PATENT DOCUMENTS

| | | | | |
|---|---|---|---|---|
| 4,979,720 | A * | 12/1990 | Robinson | A23G 1/226 |
| | | | | 249/103 |
| 6,942,476 | B2 * | 9/2005 | Parmelee | B29C 33/32 |
| | | | | 249/103 |
| 7,883,326 | B1 * | 2/2011 | Parmelee | B29D 30/0662 |
| | | | | 249/103 |
| 9,649,890 | B2 * | 5/2017 | Sakamoto | B60C 13/001 |
| 10,029,433 | B1 | 7/2018 | Ohara | |
| 2014/0261947 | A1 | 9/2014 | Sakamoto et al. | |

FOREIGN PATENT DOCUMENTS

| | | | |
|---|---|---|---|
| JP | 5421472 B1 | 2/2014 |
| JP | 2014-172360 A | 9/2014 |
| JP | 6259137 B1 | 1/2018 |

\* cited by examiner

COMPARATIVE EXAMPLE

TIRE VULCANIZATION MOLD AND TIRE MANUFACTURING METHOD USING THE SAME

CROSS-REFERENCE TO RELATED APPLICATIONS

This application is based upon and claims the benefit of priority from the prior Japanese Patent Application No. 2018-105248, filed on May 31, 2018; the entire contents of which are incorporated herein by reference.

BACKGROUND

1. Technical Field

Embodiments of the present invention relate to a tire vulcanization mold for molding a tire by vulcanizing and a tire manufacturing method using the same.

2. Related Art

Generally, an outer surface of a side portion of a pneumatic tire is provided with a mark such as a letter, a symbol, and a figure in order to easily recognize the manufacturer, the type, the size, the year or week of manufacturing, and the like of the tire. In order to form such a mark, it has been known a configuration in which a stencil plate formed by a metal plate of aluminum or iron is attached to a side molding surface of a vulcanization mold in a replaceable manner.

Conventionally, the mark has been formed in a concave shape in the outer surface of the side portion. In recent years, there has been a desire to form the mark in a convex shape, and a technique for forming convex marks has been proposed (see Japanese Patent No. 6259137 (U.S. Pat. No. 10,029,433 B1), JP-A-2014-172360 (US 2014/0261947 A1), and Japanese Patent No. 5421472).

Figure 10A:
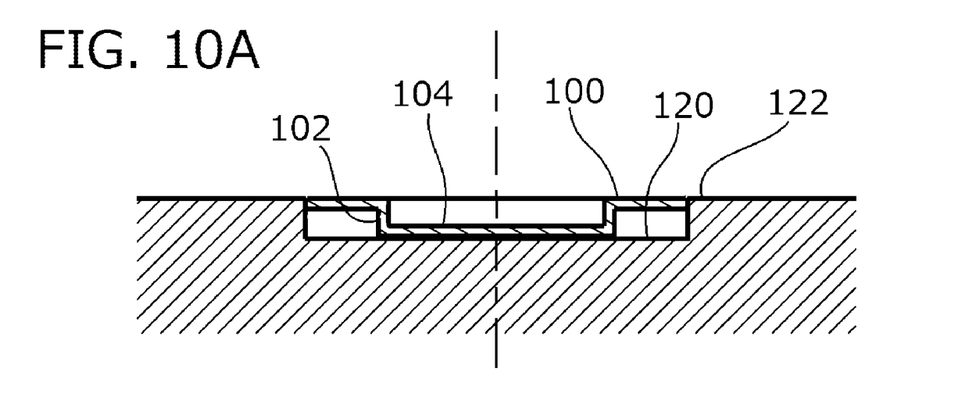
FIGS. 10A and 10B are cross-sectional views showing a state in which a stencil plate is attached to an attachment recess according to a comparative example.
Figure 10B:
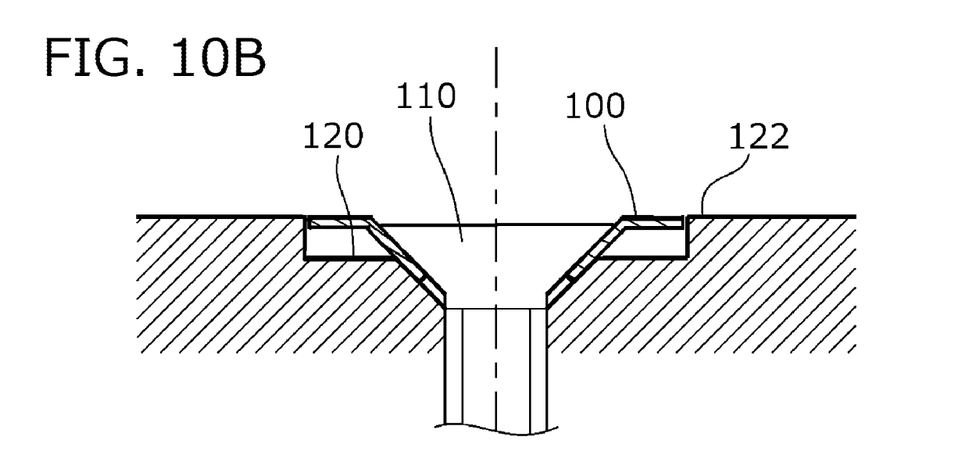

FIGS. 10A and 10B show, as an example, a stencil plate 100 for mark formation manufactured by embossing using a thin metal plate. As shown in FIG. 10A, the stencil plate 100 is provided with a convex portion 102 formed protruding on the rear surface side of the stencil plate 100 so that a concave portion 104 for mark molding is provided on the front surface side of the stencil plate 100. The stencil plate 100 is attached to an attachment recess 120 using a screw 110 at both end portions in the longitudinal direction of the stencil plate 100 (see FIG. 10B).

When the stencil plate 100 for forming a convex mark is attached to the attachment recess 120, a plurality of convex portions 102 are formed on the rear surface side of the stencil plate 100, and as a result, the attachment posture is unstable. Therefore, when both end portions of the stencil plate 100 are tightened with the screw 110, the central portion may be deformed to float up, and a gap may be formed between the stencil plate 100 and an opening peripheral portion 122 of the attachment recess 120. When such a gap is formed, rubber intrudes into the attachment recess 120 from the gap to generate a rubber burr or a flash during molding by vulcanizing of the tire.

SUMMARY

In view of the above, an object of an embodiment of the invention is to provide a tire vulcanization mold capable of suppressing the formation of rubber burrs in the mold having a stencil plate for forming a convex mark.

A tire vulcanization mold according to an embodiment of the invention includes a side molding surface for molding an outer surface of a side portion of a tire, a mark forming stencil plate for forming a convex mark at the outer surface of the side portion, an attachment recess which is provided in the side molding surface so that the stencil plate is attached thereto, and a screw which fixes the stencil plate to the attachment recess. The stencil plate is formed larger than the attachment recess so as to cover the attachment recess, and a peripheral portion of the stencil plate is in contact with an opening peripheral portion of the attachment recess.

A tire manufacturing method according to the embodiment of the invention includes molding a green tire by vulcanizing using the tire vulcanization mold.

According to the embodiment, the stencil plate is formed larger than the attachment recess and is mounted to cover the attachment recess, so the peripheral portion of the stencil plate is in contact with the opening peripheral portion of the attachment recess. As a result, the formation of a gap between the stencil plate and the attachment recess can be suppressed and the formation of rubber burrs during tire vulcanization molding can be suppressed.

BRIEF DESCRIPTION OF THE DRAWINGS

FIGS. 3A to 3C are cross-sectional views showing a state in which a stencil plate is attached to an attachment recess according to a first embodiment, wherein FIGS. 3A, 3B and 3C show cross-sectional views corresponding to lines A-A, B-B and C-C of FIG. 2, respectively.

FIGS. 6A to 6C are cross-sectional views showing a state in which a stencil plate is attached to an attachment recess according to a second embodiment, wherein FIGS. 6A, 6B and 6C show a cross-sectional views corresponding to the lines A-A, B-B and C-C of FIG. 2, respectively.

FIGS. 7A to 7C are cross-sectional views showing a state in which a stencil plate is attached to an attachment recess according to a third embodiment, wherein FIGS. 7A, 7B and 7C show a cross-sectional views corresponding to the lines A-A, B-B and C-C of FIG. 2, respectively.

FIGS. 8A to 8C are cross-sectional views showing a state in which a stencil plate is attached to an attachment recess according to a fourth embodiment, wherein FIGS. 8A, 8B and 8C show a cross-sectional views corresponding to the lines A-A, B-B and C-C of FIG. 2, respectively.

FIGS. 9A to 9C are cross-sectional views showing a state in which a stencil plate is attached to an attachment recess according to a fifth embodiment, wherein FIGS. 9A, 9B and 9C show a cross-sectional views corresponding to the lines A-A, B-B and C-C of FIG. 2, respectively.

DETAILED DESCRIPTION

Hereinafter, embodiments will be described with reference to the drawings.

First Embodiment

Figure 1:
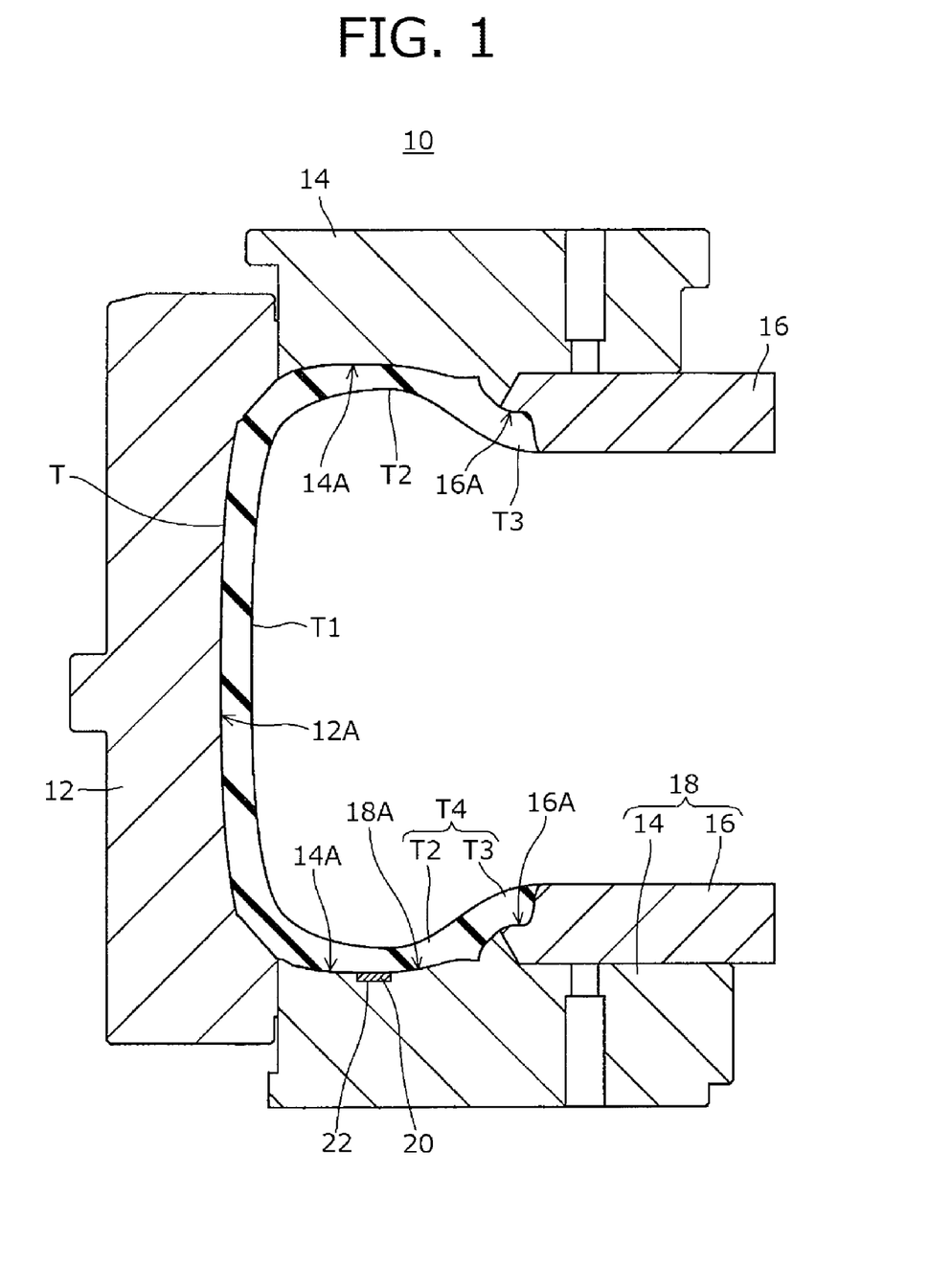
FIG. 1 is a half cross-sectional view showing a vulcanization state of a tire vulcanization mold according to an embodiment.

FIG. 1 is a diagram showing a tire vulcanization mold (hereinafter, simply referred to as a vulcanization mold) 10 according to an embodiment used for molding a pneumatic tire T by vulcanizing. Here, the pneumatic tire T includes a tread portion T1 which forms a ground surface, and a pair of sidewall portions T2 and T2 and a pair of bead portions T3 and T3 which extend inward in the tire radial direction from both ends of the tread portion T1 in the width direction. The pneumatic tire T may have a general tire structure except for a mark provided at a side portion T4. Here, the side portion T4 is a concept including the sidewall portion T2 and the bead portion T3.

The vulcanization mold 10 is a mold which sets an unvulcanized green tire and molds the tire by vulcanizing. The vulcanization mold 10 includes a tread mold 12 including a tread molding surface 12A for molding an outer surface of the tread portion T1, a pair of upper and lower sidewall molds 14 and 14 including sidewall molding surfaces 14A and 14A for molding outer surfaces of the sidewall portions T2, and a pair of upper and lower bead molds 16 and 16 including bead molding surfaces 16A and 16A for molding outer surfaces of the bead portions T3, and forms a cavity which is a space for molding the tire T.

As shown in FIG. 1, a side mold 18 which has a side molding surface 18A for molding the side portion T4 includes a stencil plate 20 for forming a mark, and an attachment recess 22 to which the stencil plate 20 is attached. Here, the side mold 18 is a concept including the sidewall mold 14 and the bead mold 16, and the side molding surface 18A is a concept including the sidewall molding surface 14A and the bead molding surface 16A.

In this example, the stencil plate 20 and the attachment recess 22 are provided in the sidewall molding surface 14A. However, the stencil plate 20 and the attachment recess 22 may be provided in the bead molding surface 16A or may be respectively provided in both the sidewall molding surface 14A and the bead molding surface 16A.

Figure 2:
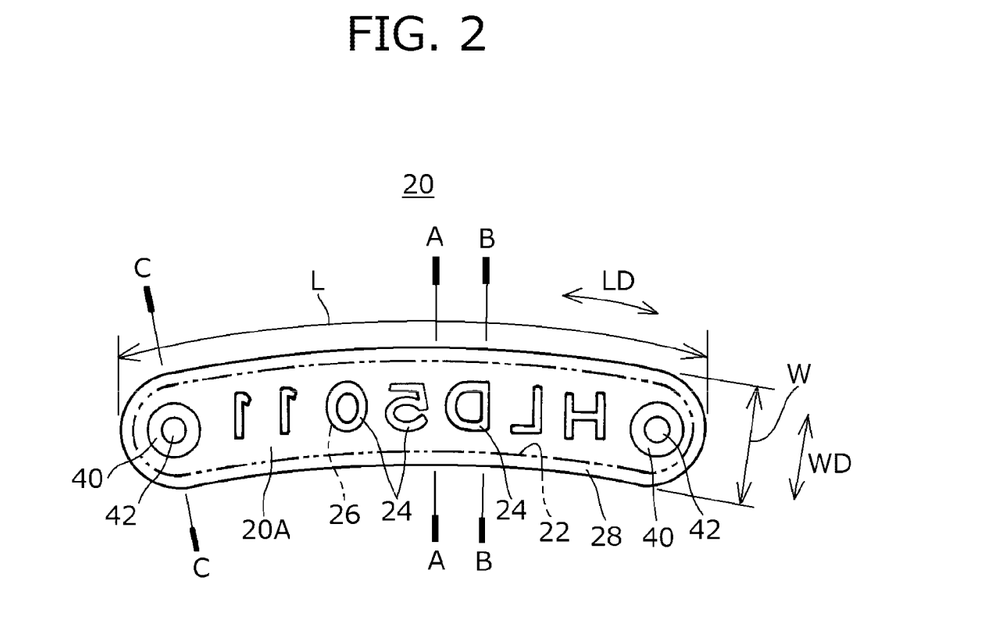
FIG. 2 is a front view of a stencil plate.
Figure 3A:
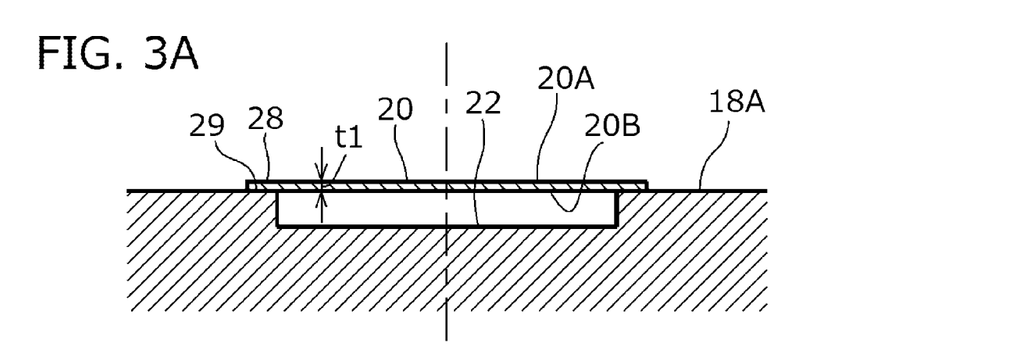
Figure 4:
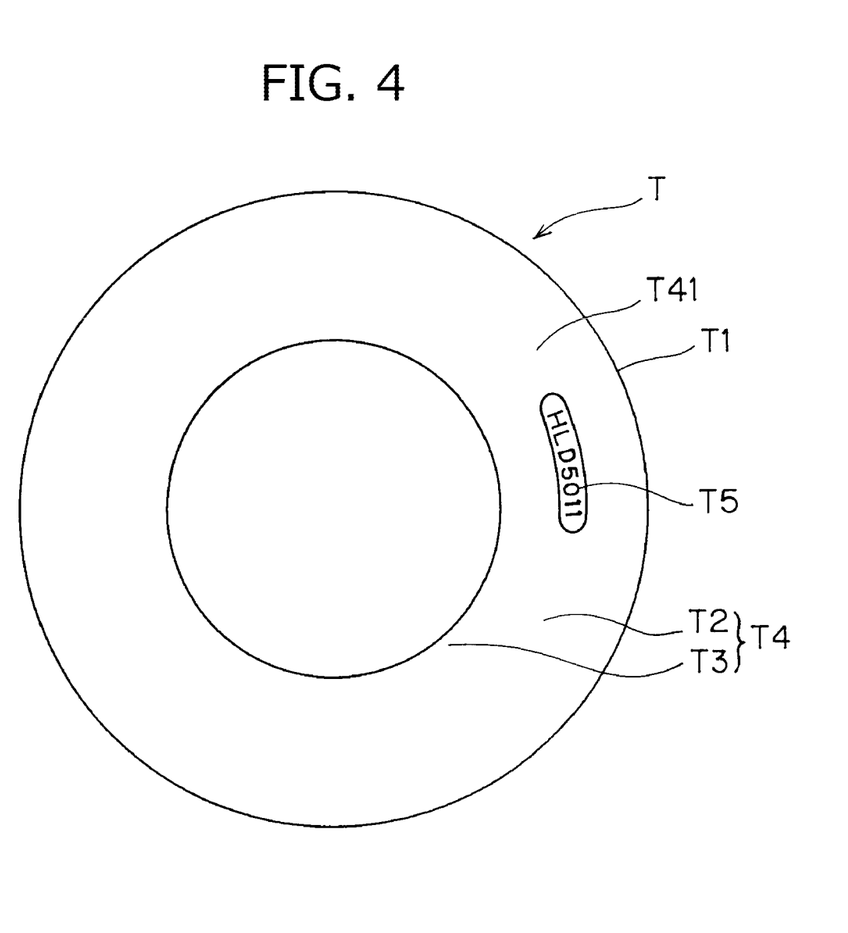
FIG. 4 is a side view of a tire.
Figure 5:
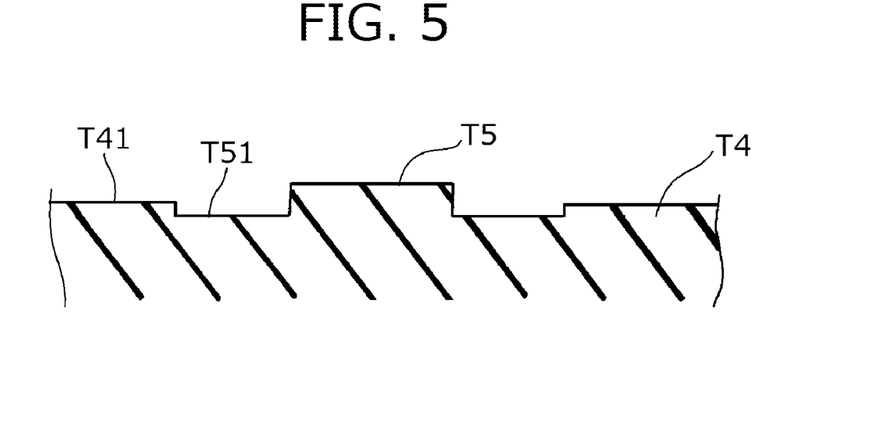
FIG. 5 is an enlarged cross-sectional view of a side portion on which a mark is formed.

The stencil plate 20 is a member for forming a convex mark T5 in an outer surface T41 of the side portion T4 as shown in FIG. 1, FIG. 4, and FIG. 5. The stencil plate 20 is formed with a laterally long metal plate of which a length L in the tire circumferential direction is larger than a width W in the tire radial direction as shown in FIG. 2. Specifically, the stencil plate 20 is an elongated strip-shaped member which extends while being curved along the tire circumferential direction. A thickness t1 (see FIG. 3A) of the metal plate is not particularly limited and may be, for example, 0.2 to 0.8 mm or 0.3 to 0.6 mm.

Figure 3B:
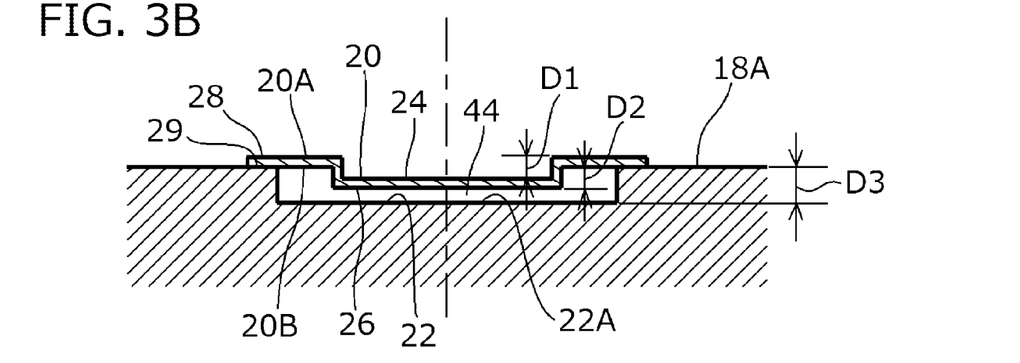

As shown in FIG. 2 and FIG. 3B, the stencil plate 20 has a plurality of convex portions 26 having a mark molding concave portion 24 for molding the mark T5 on a front surface 20A side. The convex portion 26 is formed protruding on a rear surface 20B side of the stencil plate 20 by forming the depressed mark molding concave portion 24 by embossing from the front surface 20A side of the stencil plate 20. A plurality of convex portions 26 are arranged in a row in the longitudinal direction LD of the stencil plate 20.

Specifically, in the stencil plate 20, the front surface 20A facing the tire T side (that is, facing the cavity) is provided with a plurality of mark molding concave portions 24 formed by embossing (an embossing method) from the front surface 20A side. The mark molding concave portion 24 has a shape in which the mark T5 formed in the outer surface T41 (see FIG. 4 and FIG. 5) of the side portion T4 is reversed.

As the mark T5, letters, symbols, or figures representing the manufacturer, the type, the size, the serial number, the manufacturing date, and the like of the tire can be mentioned. In the example of FIG. 2, a character string of "HLD5011" is set as the mark T5 and the mark molding concave portion 24 has a shape in which the character string is reversed. A depth D1 (see FIG. 3B) of the mark molding concave portion 24 from the front surface 20A is not particularly limited and may be, for example, 0.3 to 1.0 mm.

The convex portion 26 formed on the rear surface 20B side of the stencil plate 20 is formed on the rear surface side corresponding to the mark molding concave portion 24, and a protrusion height D2 of the convex portion 26 is substantially the same as the depth D1 of the mark molding concave portion 24.

Figure 3C:
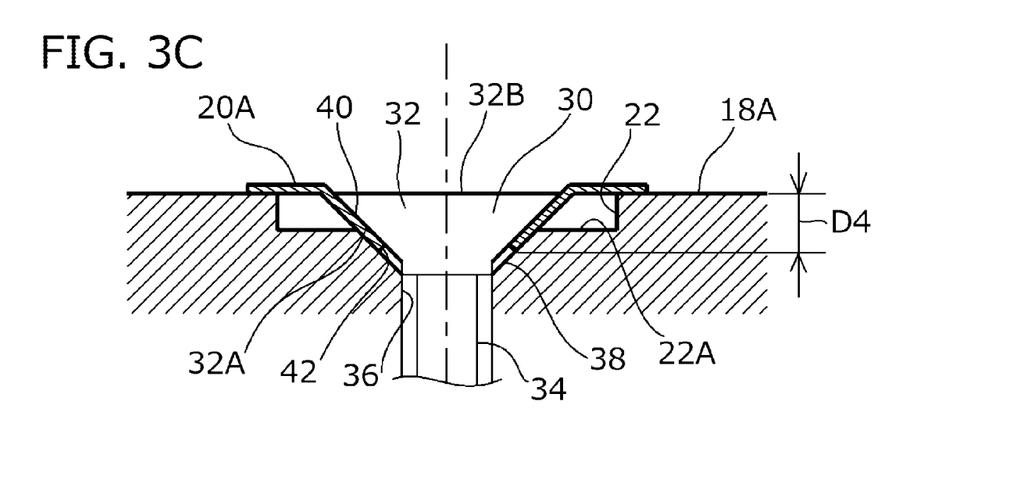

The attachment recess 22 is provided recessed in the side molding surface 18A as shown in FIGS. 3A to 3C, and the stencil plate 20 is attached thereto. As shown in FIG. 2, the attachment recess 22 is a laterally long groove corresponding to the stencil plate 20. A depth D3 (see FIG. 3B) of the attachment recess 22 is not particularly limited and may be, for example, 0.8 to 1.8 mm or 1.0 to 1.5 mm.

The stencil plate 20 is formed larger than the attachment recess 22 so as to cover the attachment recess 22. In this example, as shown in FIG. 2, the shape (that is, the contour shape) of the stencil plate 20 is formed larger than the opening shape of the attachment recess 22 over the entire circumference of the stencil plate 20. That is, the width W of the stencil plate 20 is larger than the width of the attachment recess 22, and the length L of the stencil plate 20 is larger than the length of the attachment recess 22. Therefore, the stencil plate 20 closes the entire opening of the attachment recess 22, and a peripheral portion 28 of the stencil plate 20 is provided so as to cover an opening peripheral portion 29 of the attachment recess 22 over the entire circumference of the stencil plate 20.

The stencil plate 20 is mounted on the attachment recess 22 and is tightened and fixed to the attachment recess 22 by a screw (that is, a male screw) 30, as shown in FIG. 3C. In this example, the stencil plate 20 is fixed to the attachment recess 22 by the screw 30 at both end portions in the longitudinal direction LD of the stencil plate 20.

As shown in FIG. 3C, the screw 30 includes a head portion 32 having a tapered (that is, a truncated conical shaped) bearing surface 32A, and a shaft portion 34 having threads on its outer peripheral surface. In this example, a flat screw (that is, a flat-head screw) having an upper surface 32B of the head portion 32 formed in a flat planar shape is used as the screw 30. However, for example, a round head screw having a rounded upper surface in the head portion may be used.

As shown in FIG. 3C, an attachment hole 36 into which the screw 30 is screwed is provided on a bottom (That is, bottom surface) 22A of the attachment recess 22. Screw threads are provided on the inner peripheral surface of the attachment hole 36. A tapered-surface-shaped counterbored portion 38 is provided in the opening portion (that is, the portion opening to the attachment recess 22) of the attachment hole 36. The counterbored portion 38 is formed in a truncated conical shape in which the diameter gradually decreases downwards from the bottom 22A of the attachment recess 22.

The stencil plate 20 is provided with a receiving portion 40 which receives the head portion 32 of the screw 30. The receiving portion 40 has a tapered shape to be fitted to the counterbored portion 38. Similar to the convex portion 26, the receiving portion 40 is depressed from the front surface 20A by embossing (an embossing method) from the front surface 20A side of the stencil plate 20 and is in a convex shape as viewed from the rear surface 20B. Specifically, the receiving portion 40 has a tapered shape (that is, a truncated conical shape) in which the diameter gradually decreases as getting away from the front surface 20A. Specifically, a circular through hole 42 through which the shaft portion 34 of the screw 30 passes is provided at the tip end (that is, the lower end) which is the top portion of the receiving portion 40. A protrusion height (height from the rear surface 20B) D4 of the receiving portion 40 is set larger than the protrusion height D2 of the convex portion 26.

As shown in FIG. 2, the receiving portion 40 and the through hole 42 are respectively provided at both end portions in the longitudinal direction LD of the stencil plate 20. Corresponding to the through hole 42, the attachment hole 36 is provided at both end portions in the longitudinal direction of the attachment recess 22.

When the stencil plate 20 is attached to the attachment recess 22, the stencil plate 20 is mounted on the attachment recess 22, and the shaft portion 34 of the screw 30 is screwed to the attachment hole 36 passing through the through hole 42 while the receiving portion 40 is fitted in the counterbored portion 38 of the attachment hole 36. As a result, as shown in FIG. 3C, the stencil plate 20 is fixed to the attachment recess 22 while the head portion 32 of the screw 30 is accommodated in the receiving portion 40 and the receiving portion 40 is sandwiched between the head portion 32 and the counterbored portion 38.

As shown in FIG. 3, when the stencil plate 20 is tightened by the screw 30, the peripheral portion 28 of the stencil plate 20 is in contact with the opening peripheral portion 29 of the attachment recess 22. In this example, the peripheral portion 28 is in contact with the opening peripheral portion 29 of the attachment recess 22 over the entire circumference of the peripheral portion 28.

In the present embodiment, the stencil plate 20 is formed such that a gap 44 is formed between the convex portion 26 and the bottom 22A of the attachment recess 22 in a state before tightening with the screw 30. In this example, the depth (the depth relative to the opening peripheral portion 29) D3 of the attachment recess 22 is formed larger than the protrusion height (the protrusion height relative to the peripheral portion 28 overlapping with the opening peripheral portion 29) D2 of the convex portion 26 (D3>D2). As a result, the gap 44 is formed between the convex portion 26 and the bottom 22A of the attachment recess 22 in all of the plurality of convex portions 26 of the stencil plate 20.

Here, the state before the screw 30 is tightened refers to a state in which the stencil plate 20 is fitted to the attachment recess 22 (more specifically, the receiving portions 40 at both end portions are fitted to the counterbored portion 38 of the attachment recess 22) so as to cover the attachment recess 22 and in which the screw 30 is not tightened yet. In this example, as shown in FIG. 3B, the gap 44 is formed between the convex portion 26 and the bottom 22A of the attachment recess 22 even in a state after the screw 30 is tightened.

At the time of manufacturing the pneumatic tire T by using the vulcanization mold 10 configured as described above, a green tire (an unvulcanized tire) is set inside the vulcanization mold 10 and the mold is clamped. Then, a bladder not shown in the drawings disposed inside is expanded, and the green tire is pressed against the inner surface of the mold and kept in a heated state. In this way, the green tire is molded by vulcanizing and the pneumatic tire T is obtained. The molding of the green tire can be performed by a known method.

In the obtained pneumatic tire T, as shown in FIG. 4, the mark T5 is formed at the outer surface T41 of the side portion T4 (the sidewall portion T2 in the example illustrated in the drawing). The mark T5 is formed in a convex shape protruding from the outer surface T41 of the side portion T4 as shown in FIG. 5, and the visibility is excellent.

In the embodiment, the stencil plate 20 for forming the convex mark T5 is larger than the attachment recess 22 and is mounted so as to cover the attachment recess 22. Therefore, as shown in FIG. 3, by tightening the screw 30, the peripheral portion 28 of the stencil plate 20 comes into contact with (more preferably, is pressed against) the opening peripheral portion 29 of the attachment recess 22. In other words, the peripheral portion 28 of the stencil plate 20 overlaps from above and comes into close contact with the opening peripheral portion 29 of the attachment recess 22. As a result, rubber does not intrude into the attachment recess 22 and occurrence of rubber burrs can be prevented during molding by vulcanizing.

In addition, since the gap 44 is formed between the convex portion 26 and the bottom 22A of the attachment recess 22 in a state before the screw 30 is tightened, it is possible to suppress interference between the convex portion 26 and the bottom 22A of the attachment recess 22 when the screw 30 is tightened.

Specifically, the receiving portion 40 of the stencil plate 20 may be drawn downward as the stencil plate 20 is tightened by the screw 30. In that case, particularly the convex portion 26 located near the screw 30 is easily displaced downward. Even in that case, since there is the gap 44 between the convex portion 26 and the bottom 22A of the attachment recess 22, it is possible to suppress the interference between the convex portion 26 and the bottom 22A of the attachment recess 22 when tightening with the screw 30. Therefore, it is possible to suppress the curving of the peripheral portion 28 of the stencil plate 20 and prevent occurrence of rubber burrs. In particular, in this example, since the gap 44 is provided between the convex portion 26 and the bottom 22A of the attachment recess 22 even in a state after tightening with the screw 30, it is possible to more reliably prevent the interference between the convex portion 26 and the attachment recess 22.

Second Embodiment

Figure 6A:
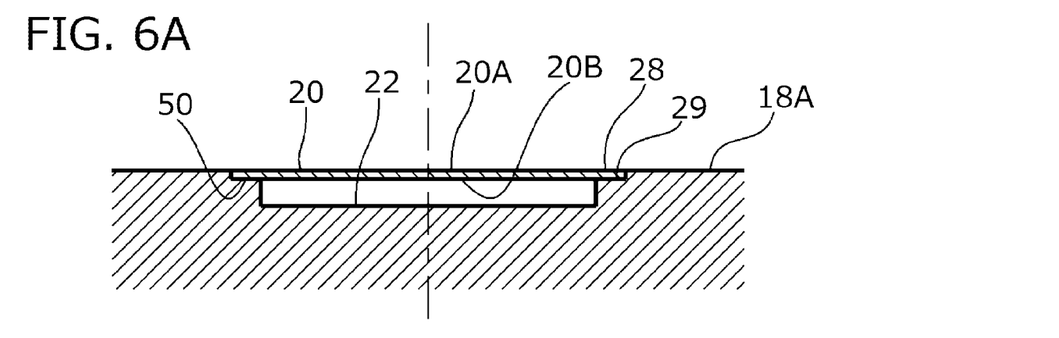
Figure 6B:
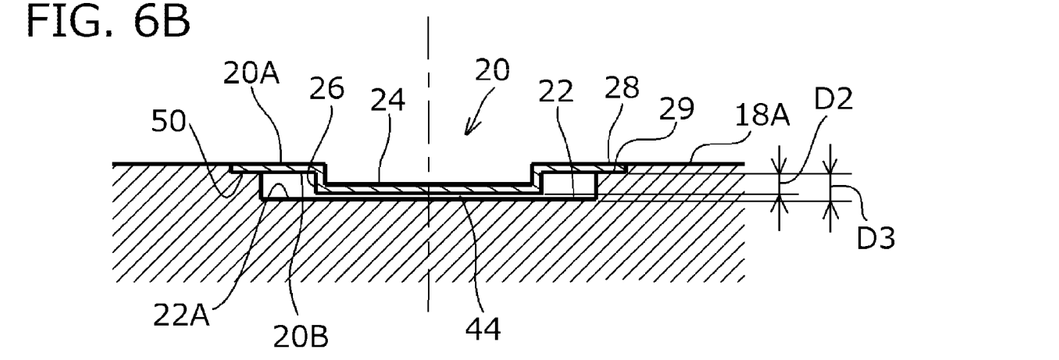
Figure 6C:
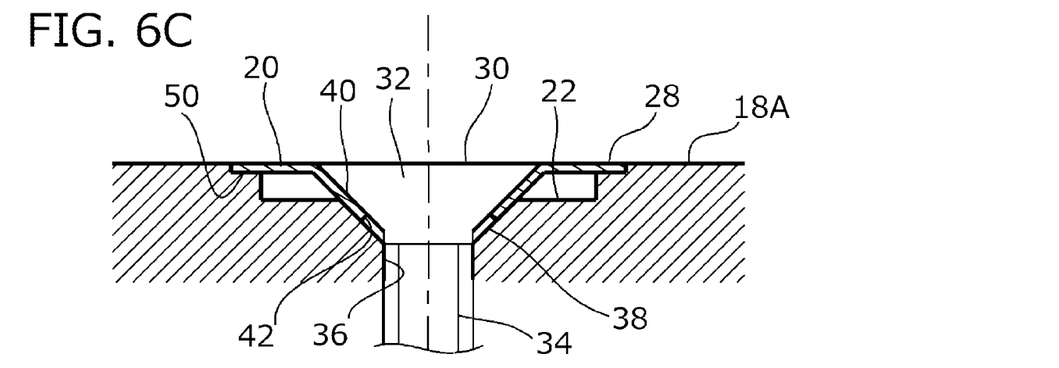

FIGS. 6A to 6C are diagrams showing a state in which the stencil plate 20 is attached to the attachment recess 22 according to the second embodiment. In the second embodiment, a hollow 50 which receives the peripheral portion 28 of the stencil plate 20 is provided in the opening peripheral portion 29 of the attachment recess 22, which is different from the first embodiment.

As shown in FIGS. 6A to 6C, in the opening peripheral portion 29 of the attachment recess 22, the hollow 50 which is depressed stepwise with respect to the side molding surface 18A is provided over the entire circumference of the opening portion of the attachment recess 22. The hollow 50 is a shallow concave portion which receives the peripheral portion 28 of the stencil plate 20, and is formed with a depth equivalent to the thickness of the peripheral portion 28 in this example.

As a result, the peripheral portion 28 of the stencil plate 20 can be flush with (that is, the same level with) the side molding surface 18A. Therefore, it is possible to eliminate a recess T51 (see FIG. 5) caused by the thickness of the stencil plate 20 on the outer surface T41 of the side portion T4 after vulcanization molding. Moreover, by fitting the peripheral portion 28 of the stencil plate 20 to the hollow 50, it is possible to position the stencil plate 20 with respect to the attachment recess 22 and it is possible to improve the workability of attachment of the stencil plate 20.

In the second embodiment, the depth (the depth relative to the opening peripheral portion 29, in this example, the depth relative to the hollow 50) D3 of the attachment recess 22 is formed larger than the protrusion height (the protrusion height relative to the peripheral portion 28 overlapping with the hollow 50 which is the opening peripheral portion 29) D2 of the convex portion 26 (D3>D2). As a result, similar to the first embodiment, the stencil plate 20 is formed such that the gap 44 is formed between the convex portion 26 and the bottom 22A of the attachment recess 22 in a state before the screw 30 is tightened. In addition, in this example, as shown in FIG. 6B, the gap 44 is provided between the convex portion 26 and the bottom 22A of the attachment recess 22 even in a state after the screw 30 is tightened. The convex portion 26 and the bottom 22A of the attachment recess 22 may also be configured to be in contact with each other in a state after tightening.

In the second embodiment, other configurations and effects are the same as those in the first embodiment and the description thereof is omitted.

Third Embodiment

Figure 7A:
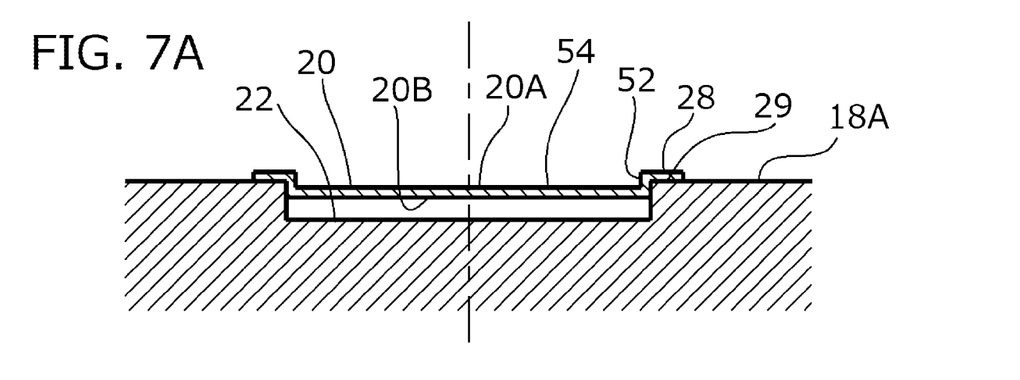
Figure 7B:
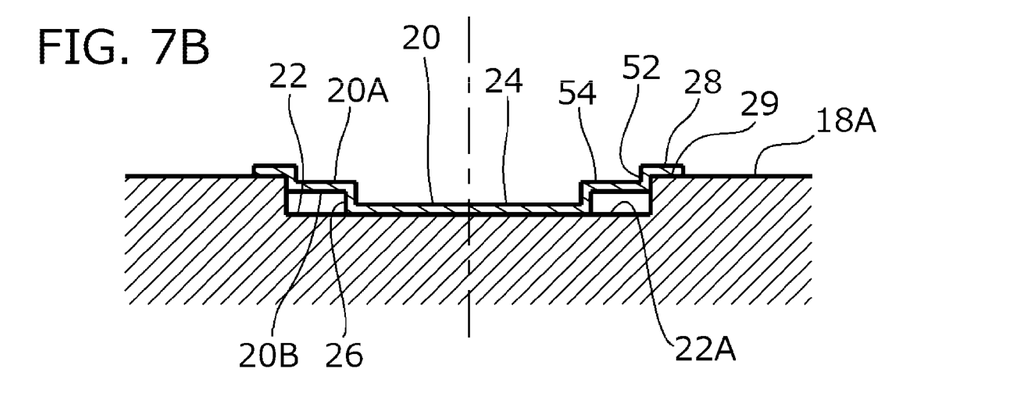
Figure 7C:
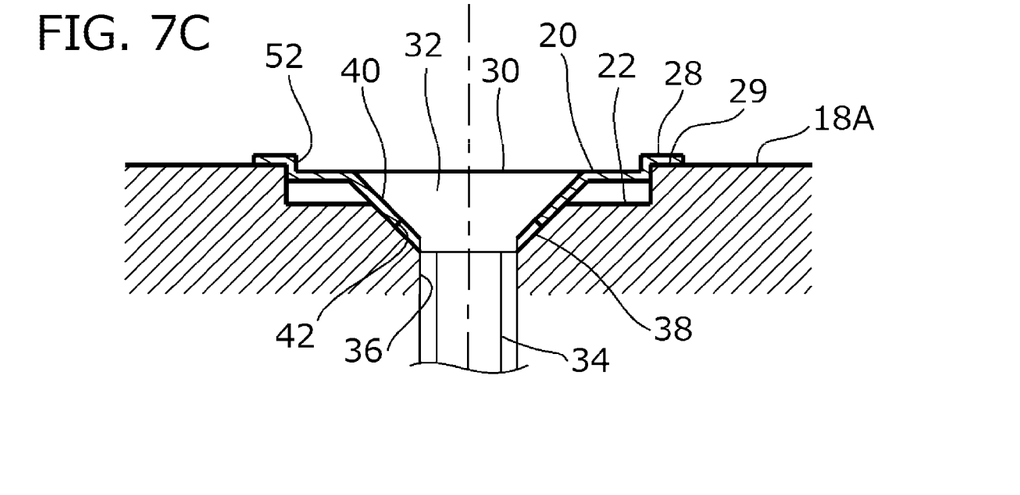

FIGS. 7A to 7C are diagrams showing a state in which the stencil plate 20 is attached to the attachment recess 22 according to the third embodiment. In the third embodiment, a stepped portion 52 which is depressed in the rear surface 20B side is provided in the peripheral portion 28 of the stencil plate 20 so as to be fitted in the inner side of the opening peripheral portion 29 of the attachment recess 22, which is different from the first embodiment.

As shown in FIGS. 7A to 7C, in the peripheral portion 28 of the stencil plate 20, the stepped portion 52 which is depressed stepwise downward is formed over the entire circumference of the opening portion of the attachment recess 22. The stepped portion 52 is a vertical wall portion connecting a body portion 54 where the convex portion 26 is formed and the peripheral portion 28, and the body portion 54 and the peripheral portion 28 in a raised position with respect to the body portion 54 are coupled via the stepped portion 52. The outer periphery of the stepped portion 52 is fitted to the opening peripheral portion 29 of the attachment recess 22.

According to the third embodiment, the stepped portion 52 is provided on the peripheral portion 28 of the stencil plate 20 to be fitted in the opening peripheral portion 29 of the attachment recess 22, and thus positioning of the stencil plate 20 with respect to the attachment recess 22 can be performed. As a result, the workability of attachment of the stencil plate 20 can be improved.

In the third embodiment, as shown in FIG. 7B, the convex portion 26 and the bottom 22A of the attachment recess 22 are brought into contact with each other in a state after tightening with the screw 30. That is, in this example, in a state before the screw 30 is tightened, similar to the first embodiment, there is a gap between the convex portion 26 and the bottom 22A of the attachment recess 22. However, this gap is formed small due to the presence of the stepped portion 52, and as a result, the gap disappears after the screw 30 is tightened. By bringing the convex portion 26 into contact with the bottom 22A of the attachment recess 22 in a state after tightening, it is possible to suppress deformation of the stencil plate 20 due to pressing of the rubber during vulcanization molding.

In the third embodiment, other configurations and effects are the same as those in the first embodiment and the description thereof is omitted.

Fourth Embodiment

Figure 8A:
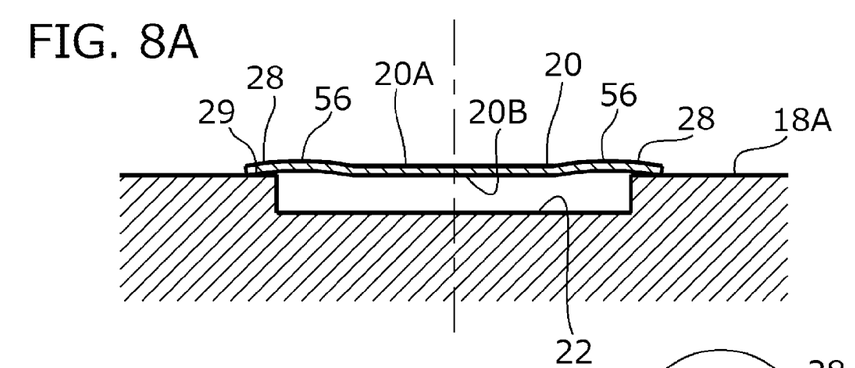
Figure 8B:
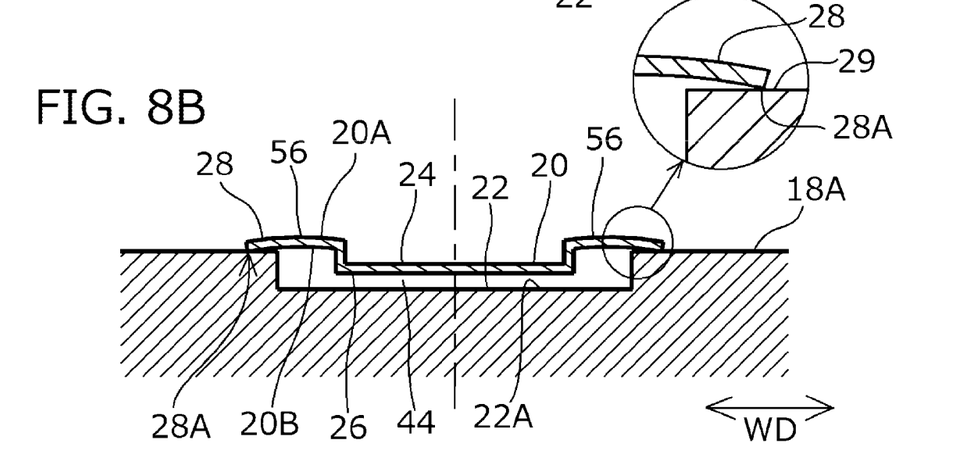
Figure 8C:
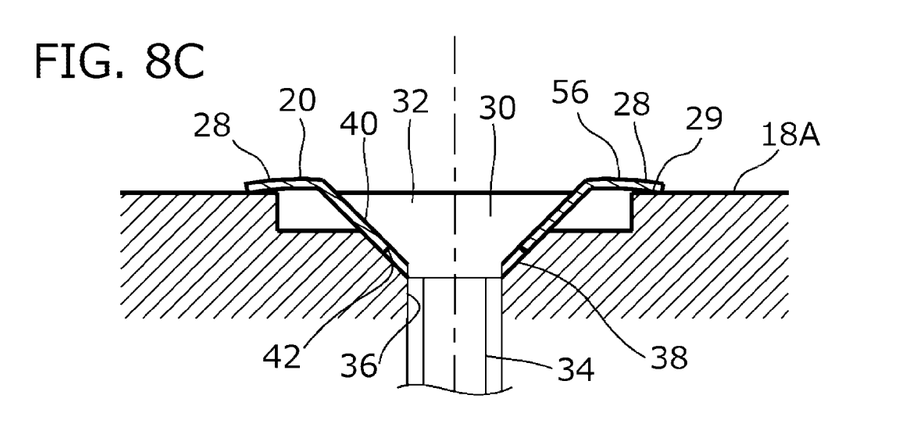

FIGS. 8A to 8C are diagrams showing a state in which the stencil plate 20 is attached to the attachment recess 22 according to the fourth embodiment. In the fourth embodiment, the peripheral portion 28 of the stencil plate 20 is formed in a shape inclined towards the rear surface 20B side, which is different from the first embodiment.

As shown in FIGS. 8A to 8C, in the stencil plate 20, a portion 56 on the outer side of the mark molding concave portion 24 in the width direction WD is formed in a shape bulging towards the front surface 20A side so that the peripheral portion 28 is formed in a shape inclined towards the rear surface 20B side. That is, the portion 56 is formed in a curved portion (hereinafter referred to as the curved portion 56) which bulges in a curved shape upward in the drawings. As a result, the peripheral portion 28 of the stencil plate 20 equivalent to the tip end portion of the curved portion 56 has a gently inclined shape so that a tip end 28A is at the lowest position.

According to the fourth embodiment, since the peripheral portion 28 of the stencil plate 20 is formed in a shape inclined towards the rear surface 20B side, the tip end 28A of the peripheral portion 28 of the stencil plate 20 is in a line contact with the opening peripheral portion 29 of the attachment recess 22 while being strongly pressed against the opening peripheral portion 29 of the attachment recess 22. As a result, it is possible to suppress curving such as upward deformation of the tip end 28A of the peripheral portion 28 even when it is tightened too strongly during tightening with the screw 30. Therefore, the sealing property of the rubber at the peripheral portion 28 can be further enhanced.

The enlarged view in FIG. 8B shows a state in which the tip end 28A of the peripheral portion 28 of the stencil plate 20 is in a line contact with the opening peripheral portion 29 of the attachment recess 22 after tightening with the screw 30. However, in the state after tightening, similar to the first embodiment, the peripheral portion 28 and the opening peripheral portion 29 may be brought into contact in a surface contact state by the bending deformation of the portion 56.

In the fourth embodiment, other configurations and effects are the same as those in the first embodiment and the description thereof is omitted.

Fifth Embodiment

Figure 9A:
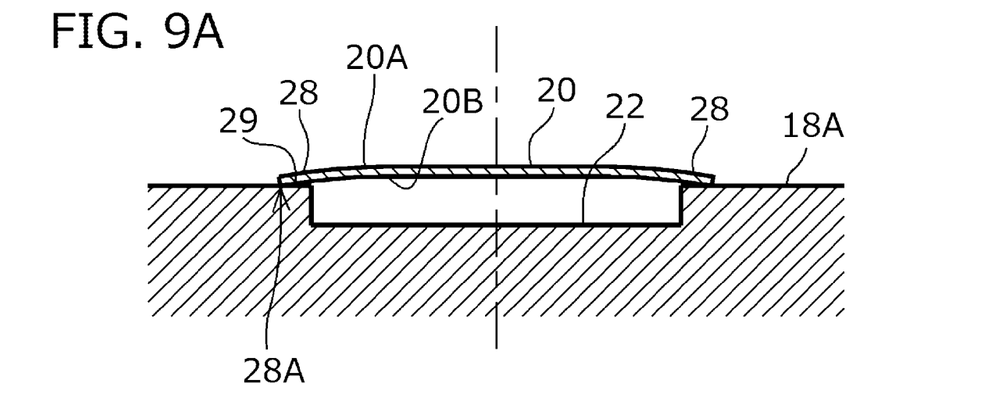
Figure 9B:
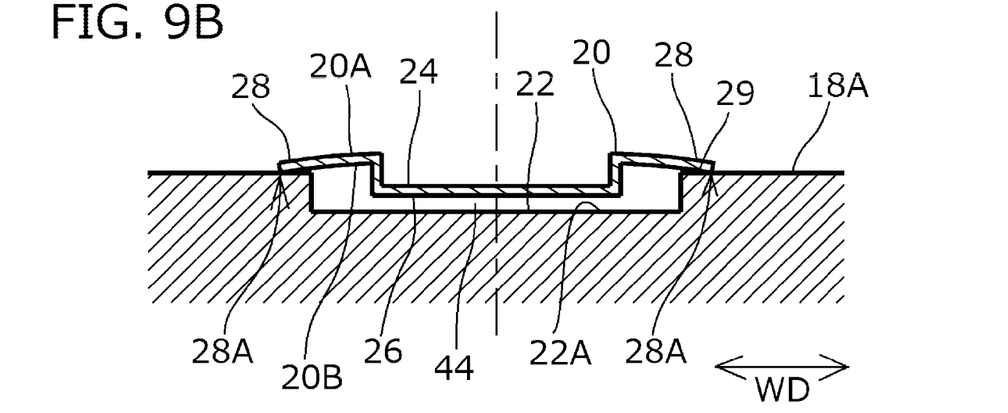
Figure 9C:
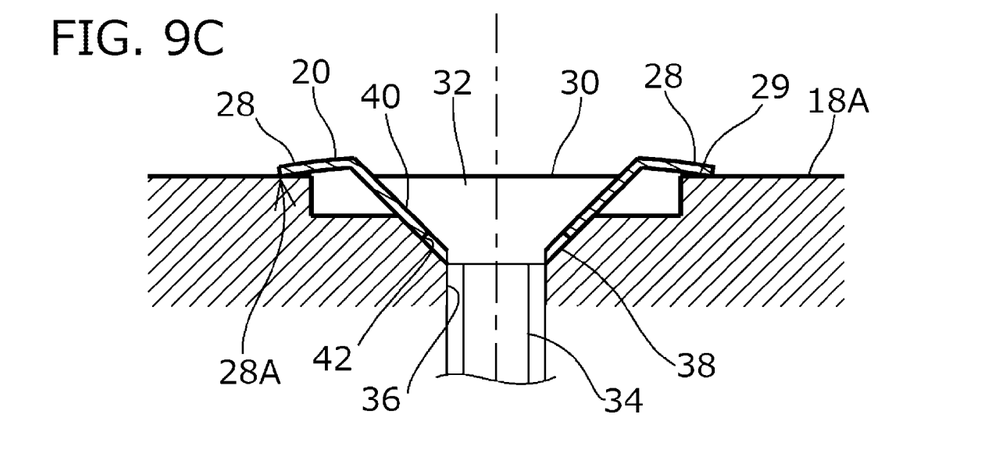

FIGS. 9A to 9C are diagrams showing a state in which the stencil plate 20 is attached to the attachment recess 22 according to the fifth embodiment. In the fifth embodiment, the stencil plate 20 is formed in a shape such that the entire width direction WD of the stencil plate 20 bulges towards the front surface 20A side, which is different from the fourth embodiment.

As shown in FIGS. 9A to 9C, the stencil plate 20 is formed in a shape such that the entire width direction WD of the stencil plate 20 bulges towards the front surface 20A side so that the peripheral portion 28 is formed in a shape inclined towards the rear surface 20B side. Specifically, the stencil plate 20 has a shape that the central portion thereof bulges upward so that the central portion in the width direction WD is higher than both end portions in the width direction WD, and both end portions have a gently inclined shape so that the tip end 28A is at the lowest position.

According to the fifth embodiment, similar to the fourth embodiment, the tip end 28A of the peripheral portion 28 of the stencil plate 20 is in a line contact with the opening peripheral portion 29 of the attachment recess 22 while being strongly pressed against the opening peripheral portion 29 of the attachment recess 22. As a result, it is possible to suppress curving such as upward deformation of the tip end 28A of the peripheral portion 28 even when it is tightened too strongly during tightening with the screw 30. Therefore, the sealing property of the rubber at the peripheral portion 28 can be further enhanced.

In the fifth embodiment, similar to the fourth embodiment, in the state after tightening with the screw 30, the peripheral portion 28 of the stencil plate 20 and the opening peripheral portion 29 of the attachment recess 22 may be brought into contact in a surface contact state. In the fifth embodiment, other configurations and effects are the same as those in the fourth embodiment and the description thereof is omitted.

Other Embodiments

In the aforementioned embodiments, the gap 44 is formed between the convex portion 26 and the bottom 22A of the attachment recess 22 in a state before the screw 30 is tightened. The gap 44 may disappear after the screw 30 is tightened, and the convex portion 26 and the bottom 22A of the attachment recess 22 may be in contact with each other, as in the third embodiment. In a case where the receiving portion 40 of the stencil plate 20 is not drawn downward when tightening with the screw 30, the convex portion 26 and the bottom 22A of the attachment recess 22 may be in contact with each other without a gap in a state before the screw 30 is tightened. All characteristic configurations in the aforementioned embodiments may be appropriately combined.

Several embodiments have been described above. However, these embodiments have been presented as examples and are not intended to limit the scope of the invention. These novel embodiments can be implemented in various other forms, and various omissions, substitutions, and modifications can be made without departing from the spirit of the invention.

What is claimed is:

1. A tire vulcanization mold comprising:
   a side molding surface for molding an outer surface of a side portion of a tire,
   a mark forming stencil plate for forming a convex mark at the outer surface of the side portion,
   an attachment recess which is provided in the side molding surface so that the stencil plate is attached thereto, and
   a screw which fixes the stencil plate to the attachment recess,
   wherein the stencil plate is formed larger than the attachment recess so as to cover the attachment recess, and a peripheral portion of the stencil plate is in contact with an opening peripheral portion of the attachment recess, and
   the stencil plate has a convex portion formed protruding on a rear surface side of the stencil plate so that a concave portion for mark molding is formed on a front surface side of the stencil plate, a gap is formed between the convex portion and a bottom of the attachment recess in a state in which the stencil plate is fitted to the attachment recess so as to cover the attachment recess and in which the screw is not tightened yet, and the convex portion and the bottom of the attachment recess are in contact with each other in a state in which the screw is already tightened.

2. The tire vulcanization mold according to claim 1, wherein a hollow which receives the peripheral portion of the stencil plate is provided in the opening peripheral portion of the attachment recess.

3. The tire vulcanization mold according to claim 1, wherein a stepped portion which is depressed in the rear surface side of the stencil plate is provided in the peripheral portion of the stencil plate so as to be fitted in an inner side of the opening peripheral portion of the attachment recess.

4. A tire vulcanization mold comprising:
   a side molding surface for molding an outer surface of a side portion of a tire,
   a mark forming stencil plate for forming a convex mark at the outer surface of the side portion,
   an attachment recess which is provided in the side molding surface so that the stencil plate is attached thereto, and
   a screw which fixes the stencil plate to the attachment recess,
   wherein the stencil plate is formed larger than the attachment recess so as to cover the attachment recess, and a peripheral portion of the stencil plate is in contact with an opening peripheral portion of the attachment recess,
   the opening peripheral portion of the attachment recess that is in contact with the peripheral portion of the stencil plate is flush with the side molding surface, and
   the peripheral portion of the stencil plate is formed in a shape inclined towards a rear surface side of the stencil plate.

5. The tire vulcanization mold according to claim 4, wherein the stencil plate has a convex portion formed protruding on the rear surface side of the stencil plate so that a concave portion for mark molding is formed on a front surface side of the stencil plate, and a portion on an outer side of the concave portion for mark molding in the width direction is formed in a shape bulging towards the front surface side so that the peripheral portion of the stencil plate is formed in a shape inclined towards the rear surface side.

6. The tire vulcanization mold according to claim 4, wherein the stencil plate is formed in a bulge shape such that an entire width direction thereof bulges towards a front surface side of the stencil plate so that the peripheral portion is formed in a shape inclined towards the rear surface side.

7. The tire vulcanization mold according to claim 1, wherein the stencil plate has a plurality of embossed convex portions as the convex portion, and the plurality of embossed convex portions each have an embossed concave portion as the concave portion for mark molding.

8. The tire vulcanization mold according to claim 5, wherein the stencil plate has a plurality of embossed convex portions as the convex portion, and the plurality of embossed convex portions each have an embossed concave portion as the concave portion for mark molding.

9. The tire vulcanization mold according to claim 1, wherein the stencil plate is an embossed metal plate having a constant thickness.

10. The tire vulcanization mold according to claim 4, wherein the stencil plate is an embossed metal plate having a constant thickness.

11. The tire vulcanization mold according to claim 6, wherein a central portion of the bulge shape bulges higher upwards than both end portions of the bulge shape.

12. A tire manufacturing method comprising molding a green tire by vulcanizing using the tire vulcanization mold according to claim 2.

13. A tire manufacturing method comprising molding a green tire by vulcanizing using the tire vulcanization mold according to claim 2.

14. A tire manufacturing method comprising molding a green tire by vulcanizing using the tire vulcanization mold according to claim 3.

15. A tire manufacturing method comprising molding a green tire by vulcanizing using the tire vulcanization mold according to claim 4.

16. A tire manufacturing method comprising molding a green tire by vulcanizing using the tire vulcanization mold according to claim 5.

17. A tire manufacturing method comprising molding a green tire by vulcanizing using the tire vulcanization mold according to claim 6.

\* \* \* \* \*